US007557844B2

United States Patent
Andersson

(10) Patent No.: US 7,557,844 B2
(45) Date of Patent: *Jul. 7, 2009

(54) ACTIVE PIXEL SENSOR (APS) READOUT STRUCTURE WITH AMPLIFICATION

(75) Inventor: Anders Andersson, Pasadena, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 562 days.

This patent is subject to a terminal disclaimer.

(21) Appl. No.: 11/022,945

(22) Filed: Dec. 28, 2004

(65) Prior Publication Data

US 2005/0151869 A1 Jul. 14, 2005

Related U.S. Application Data

(63) Continuation of application No. 09/595,592, filed on Jun. 15, 2000, now Pat. No. 6,844,897.

(60) Provisional application No. 60/139,348, filed on Jun. 15, 1999.

(51) Int. Cl.
*H04N 3/14* (2006.01)
*H04N 5/335* (2006.01)

(52) U.S. Cl. .................................... 348/294; 250/208.1
(58) Field of Classification Search .................... None
See application file for complete search history.

(56) References Cited

U.S. PATENT DOCUMENTS

| 5,471,515 | A | 11/1995 | Fossum et al. |
| 5,920,345 | A | 7/1999 | Sauer |
| 5,929,434 | A * | 7/1999 | Kozlowski et al. ...... 250/214 A |
| 6,130,423 | A * | 10/2000 | Brehmer et al. .......... 250/208.1 |
| 6,222,175 | B1 * | 4/2001 | Krymski .................. 250/208.1 |
| 6,493,030 | B1 | 12/2002 | Kozlowski et al. |

* cited by examiner

*Primary Examiner*—Sinh Tran
*Assistant Examiner*—Yogesh Aggarwal
(74) *Attorney, Agent, or Firm*—Dickstein Shapiro LLP

(57) ABSTRACT

An active pixel sensor (APS) includes an array of individually addressable APS cells ad a pixel readout structure that includes an amplifier. The amplifier may have a two-branched structure and provide a gain of one or higher. Additional switches may be provided in the pixels to provide protection for pixel output transistors from voltage changes in the column line. Structure may also be provided for optional gain selection in the amplifier.

7 Claims, 7 Drawing Sheets

ACTIVE PIXEL SENSOR (APS) READOUT STRUCTURE WITH AMPLIFICATION

CROSS REFERENCE TO RELATED APPLICATION

This application is a continuation of application Ser. No. 09/595,592, filed Jun. 15, 2000, now U.S. Pat. No. 6,844,897 which also claims the benefit of the U.S. Provisional application Ser. No. 60/139,348 entitled NOVEL IDEA FOR A NEW READOUT STRUCTURE OF APS filed on Jun. 15, 1999, which are hereby incorporated by reference in their entireties.

BACKGROUND

Active pixel sensor (APS) imaging devices are described in U.S. Pat. No. 5,471,515. These imaging devices include an array of pixel cells that convert light energy into electrical signals. Each pixel includes a photodetector and one or more active transistors formed of MOS technology. The transistors typically provide amplification, readout control and reset control, in addition to producing the electrical signal output from the cell.

APS devices may be fabricating using CMOS technology. An APS sensor, including a pixel array and readout structure, may be provided on the same integrated circuit (IC) chip. The gain stage of the APS sensor may consume a considerable amount of the chip area. However, reducing the size of this area may sacrifice signal gain in the APS sensor.

The readout structure of an APS typically includes a source follower transistor. Use of such a transistor may itself limit the dynamic range of the sensor when reading out the pixel and provide a voltage gain less than unity.

SUMMARY

An active pixel sensor (APS) according to an embodiment includes an array of individually addressable APS cells, each of which include a row select transistor and an output transistor, and a pixel readout structure that includes an amplifier. The amplifier structure includes the row select transistor and output transistor of each pixel. The amplifier may provide a gain of one or higher.

According to an embodiment, the amplifier has a two branched structure. One branch includes a transistor connected to $V_{DD}$, and the output transistor and the row select transistor for each pixel in a column. The other branch includes three transistors in series, the first connected to $V_{DD}$, and the third connected to the drain of a source follower transistor connected to ground. The row select transistor for each pixel in the column is also connected to the source follower transistor. The transistors in the branches connected to $V_{DD}$ may be p-type MOSFETS and the other transistors may be n-type MOSFETS.

According to another embodiment, a transistor may be connected between the pixel output transistor and the p-type transistor in each pixel to protect the output transistor from voltage charges in the column line.

According to another embodiment, the amplifier may be provided with a gain selector to optionally change the gain in the amplifier. The gain selector may comprise two p-type transistors connected between the source of the p-type transistor in each branch and $V_{DD}$: a gain transistor and a gain-enable transistor. The gain transistor, connected to $V_{DD}$, may be self-biased, and the gain-enable transistor may be controlled between ON and OFF states by a gain voltage source. When the gain-enable transistor is ON, the gain transistor and other transistor at $V_{DD}$ are effectively in parallel, thereby altering the gain of the amplifier.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
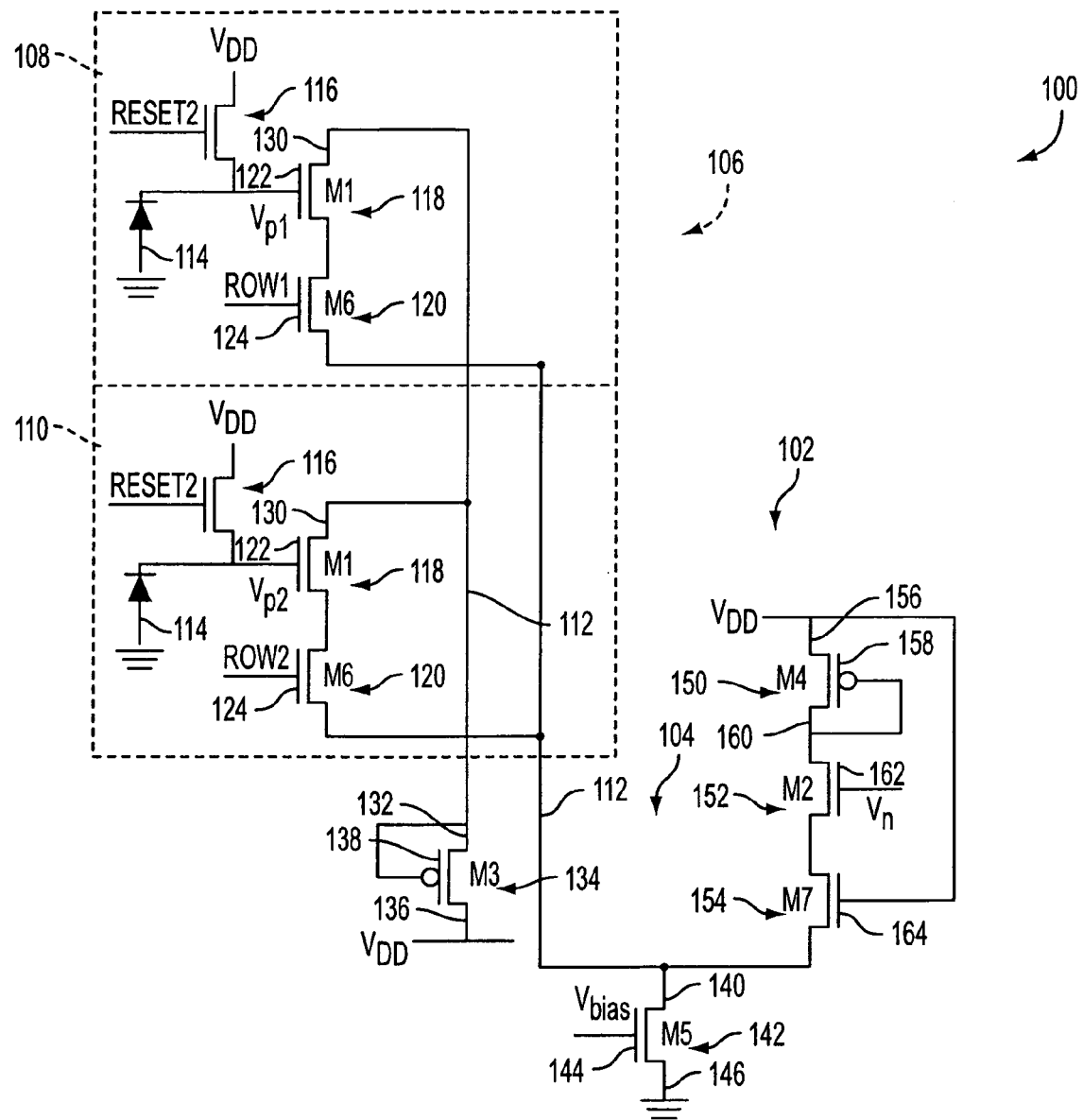
FIG. 1 is a schematic diagram of an active pixel sensor (APS) including an amplifier circuit in the readout structure according to an embodiment.

An embodiment is shown in FIG. 1. The readout structure 102 of an active pixel sensor (APS) 100 includes an amplifier circuit 104. The APS includes an array 106 of independently addressable pixels arranged in n rows and m columns. FIG. 1 illustrates two of the pixels 108, 110 that are connected to a column of line 112 of the pixel array. Pixel 108 is in row 1 and pixel 110 is in row 2. Each pixel includes a photodetector 114, such as a photogate, photodiode or pinned photodiode, a reset transistor 116, a source-follower output transistor 118 (denoted M1), and a row select transistor 120 (denoted M6). The gate 122 of the output transistor is connected to a pixel voltage provided by the photodetector. The gate 124 of the row select transistor 120 is connected to a row enable voltage which is set HIGH when the pixel is being read out, thereby allowing the voltage on the output transistor to be passed to the column line 112. The output transistor 118 and row select transistors 120 may be n-type MOSFET transistors.

The drain 130 of each output transistor 118 in the column is connected to the source 132 of a p-type transistor 134 (denoted M3). The drain 136 of transistor 134 is connected to a system drain voltage $V_{DD}$, and the gate 138 of transistor 134 is connected to its source. The source of each row select transistor 120 in the column is connected to the drain 140 of an n-type source follower transistor 142, which has a gate 144 connected to a bias voltage, $V_{bias}$, and a source 146 connected to ground.

When a pixel is being read out, the p-type transistor 134, pixel output transistor 118, and pixel row enable transistor 120 form one branch of the amplifier circuit 104. A second branch of the amplifier circuit includes a p-type transistor 150 (denoted M4) and two n-type transistors 152, 154 (denoted M2 and M7, respectively). The drain 156 of p-type transistor 150 may be connected to $V_{DD}$ and its gate 158 connected to its source 160. The drain of transistor 152 is connected to the source of transistor 150 and the gate 162 is connected to a load voltage $V_n$. The drain of transistor 154 is connected to the source of transistor 152, its gate 164 is connected to $V_{DD}$ and its source is connected to the drain of source-follower transistor 142. Transistor 154 in the second branch may be provided for symmetry with row enable transistor 120 in the pixel being read out.

Figure 2:
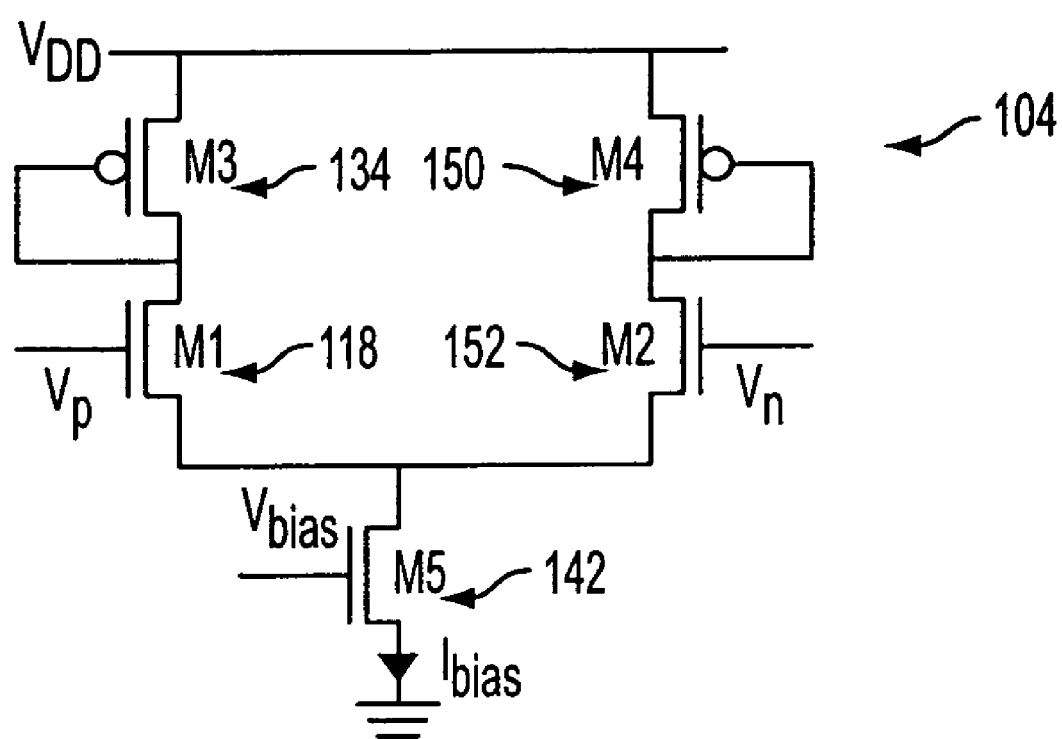
FIG. 2 is a schematic diagram of an amplifier according to the embodiment of FIG. 1.

When the pixel is read out, the row enable voltage is set HIGH, and row select transistor 120 and transistor 154 are essentially shorted out. The relationship of the remaining transistors in the amplifier circuit 104 may be described as shown in FIG. 2. The gain of the amplifier is:

$$A_0 = g_{m1}*(r_{ds2}//r_{s4}) = //r_{ds2} >> r_{s4}// \approx g_{m1}*r_{s4} = g_{m1}/g_{m4} = // \mu_n \approx 3*\mu_p// \approx (3*(W/L)_1/(W/L)_4)^{1/2} \quad (1)$$

When $V_p$ equals $V_n$ the output is the same and these outputs are:

$$V_{out+} = V_{out-} = V_{DD} - V_{gs4} = V_{DD} - V_{eff} - |V_{tp}| = V_{DD} - (I_{bias}/ \mu_p*C_{ox}*(W/L)_4)^{1/2} - |V_{tp}| \quad (2)$$

A simple first order transfer function of a dominant pole op amp can be described by:

$$A_v(s) = A_0/(1+s/\omega) \quad (3)$$

$$A_v(s) = g_{m1}*(r_{out}//1/sC_L) = \text{for midband frequencies } C_L \text{ dominates} = g_{m1}/sC_L => / |A_v(j\omega_{ta})| = 1/=> \quad (4)$$

$$\omega_{ta} = g_{m1}/C_L => /\omega << \omega_{ta}/; \text{ and} \quad (5)$$

$$A_0*\omega = \omega_{ta} = g_{m1}/C_L => \quad (6)$$

$$t_{switch} \approx C_L*A_0/g_{m1}, \text{ where} \quad (7)$$

$G_m$ is the transistor's transconductance,
$R_{ds}$ is the Drain-Source resistance,
$R_s$ is the source resistance,
$C_{ox}$ is the gate oxide,
$V_{gs}$ is the Gate-Source voltage,
$V_{tp}$ is the threshold voltage for PMOS,
W is the channel width,
L is the channel length,
$\mu_n$ is the mobility of the NMOS transistor,
$\mu_p$ is the mobility of the PMOS transistor, and
the subscripted numerals refer to the transistor denotations.

Typical values in a 0.8 μm-process are:

$$|V_{tp}| = |V_{tn}| = 0.8V; \text{ and}$$

$$\mu_n*C_{ox} \approx 3*\mu_p*C_{ox} \approx 90 \text{ μA/V}.$$

The dimensions of the various transistors may be adjusted to reduce noise. For example, the length of transistor 150 (M4) may be decreased to decrease flicker noise. Input noise may be independent of the width of transistor 150. That width hence may be widened to maximize signal swing at the output. Also, increasing the length of the pixel output transistor 118 may increase noise, whereas increasing the width of the transistor 118 may reduce flicker noise, thermal noise, and white noise.

Figure 3:
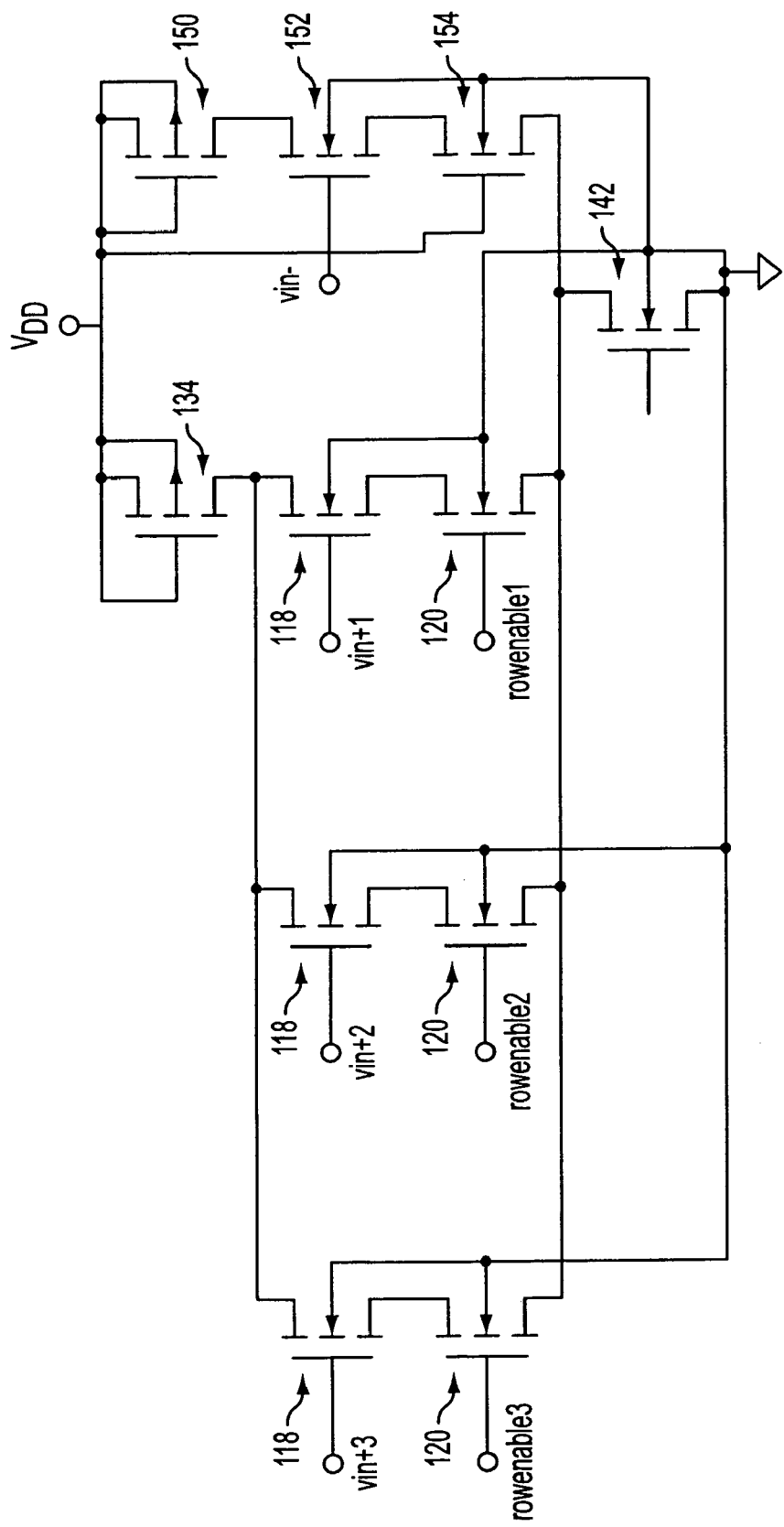
FIG. 3 is a schematic diagram of an APS according to another embodiment.
Figure 4:
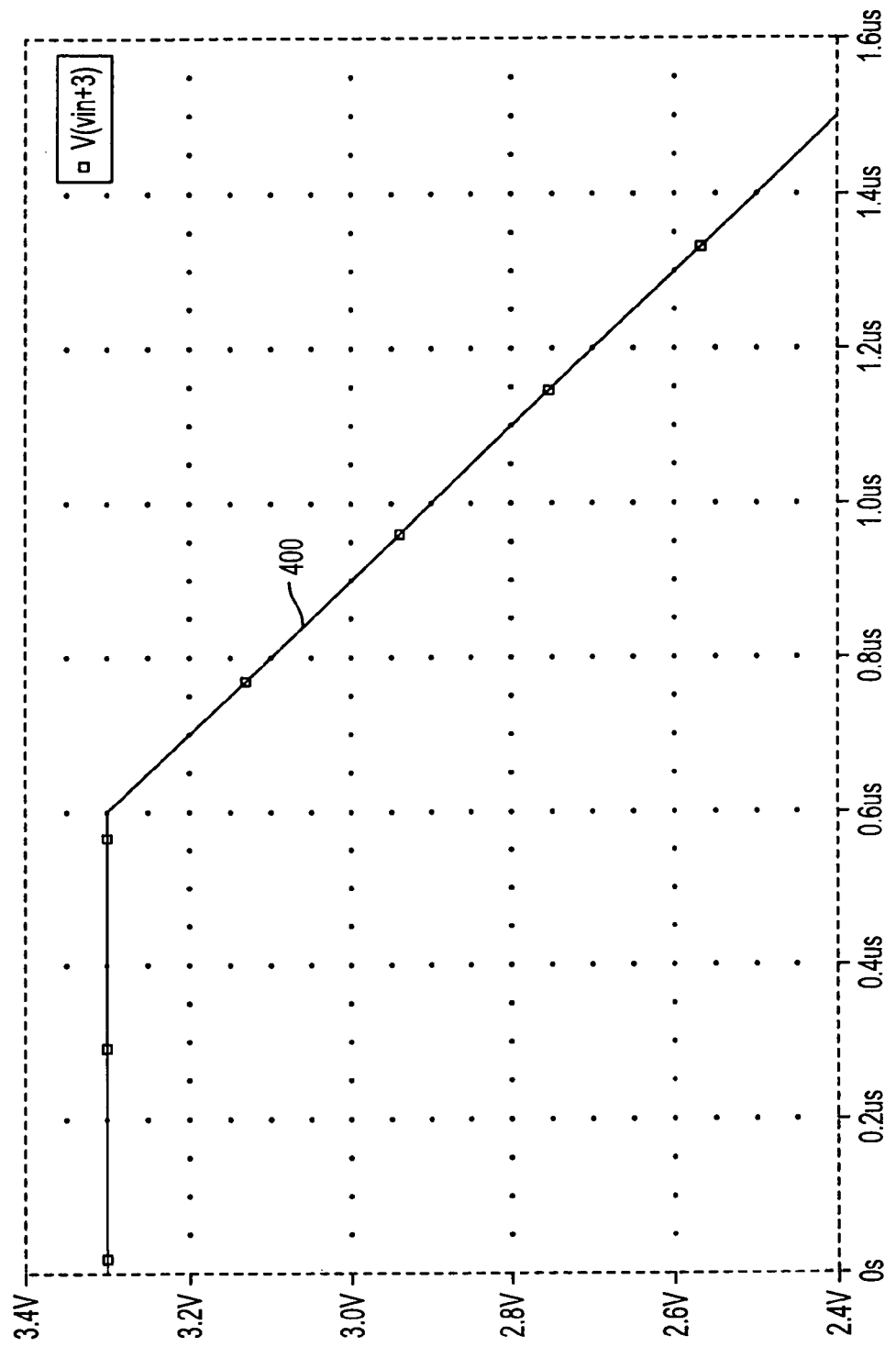
FIG. 4 is a graph illustrating an input signal for a simulation performed on the embodiment of FIG. 3.
Figure 5:
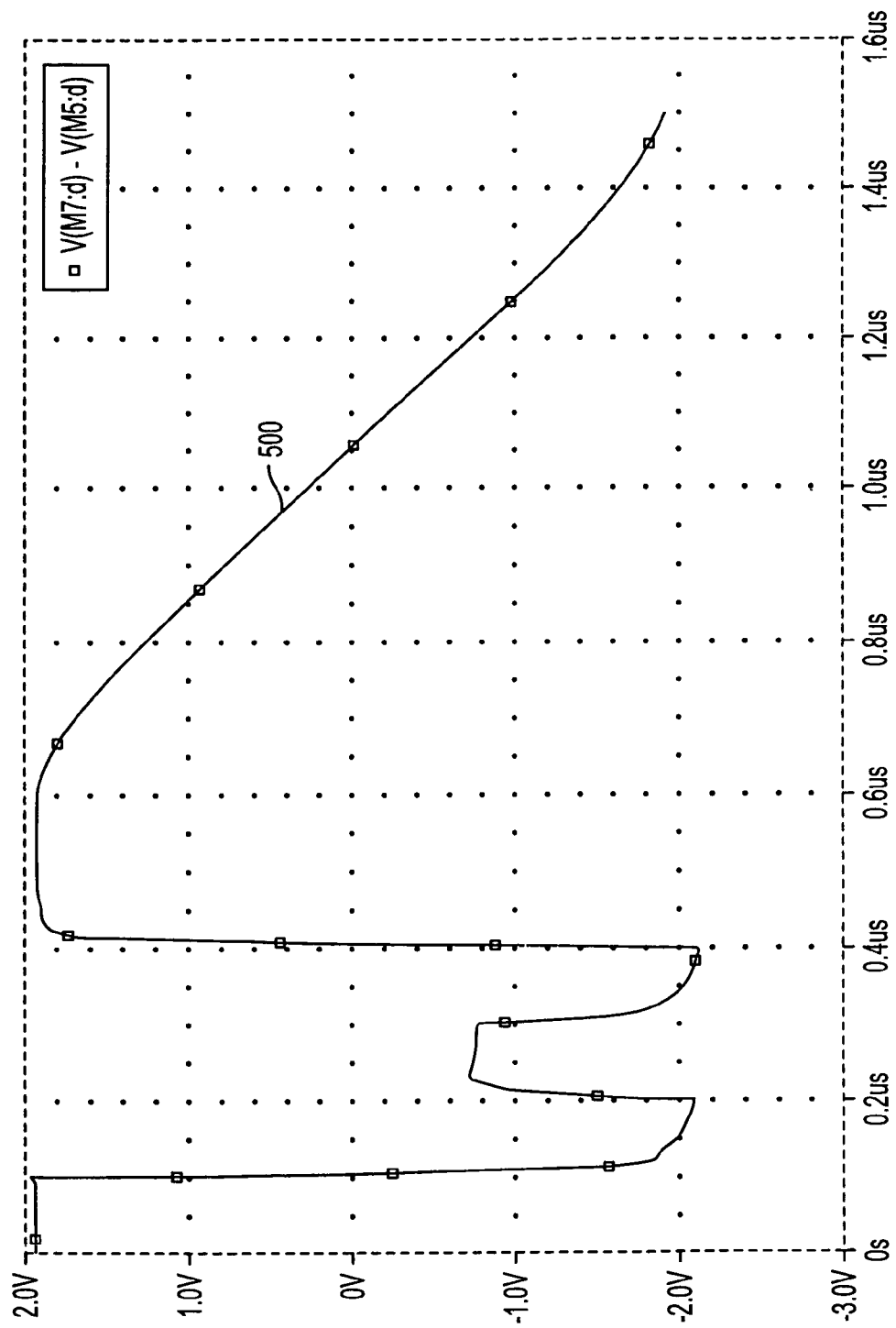
FIG. 5 is a graph illustrating a response of the embodiment of FIG. 3 with the input of FIG. 4.

The gain of the amplifier 104 according to the embodiment may be set to unity or higher. The response of a simulated sensor according to the embodiment shown in FIG. 3 was demonstrated with a gain value set to four (4). The simulation included three pixels, each with a pixel voltage, $V_{in+1}$, $V_{in+2}$, and $V_{in+3}$, respectively. The potentials used in the simulation were as follows: $V_{DD}=5$ V; $V_{in-}=2.85$ V; $V_{in+1}=3.3$ V; $V_{in+2}=2.7$ V; and $V_{bias}=1.2$ V. $V_{in+3}$ 400 was varied as shown in FIG. 4. FIG. 5 illustrates the voltage response 500 of the simulated sensor. The sensor including the amplifier in the readout structure demonstrated a relatively higher dynamic range and gain than expected from a source follower transistor alone.

Figure 6:
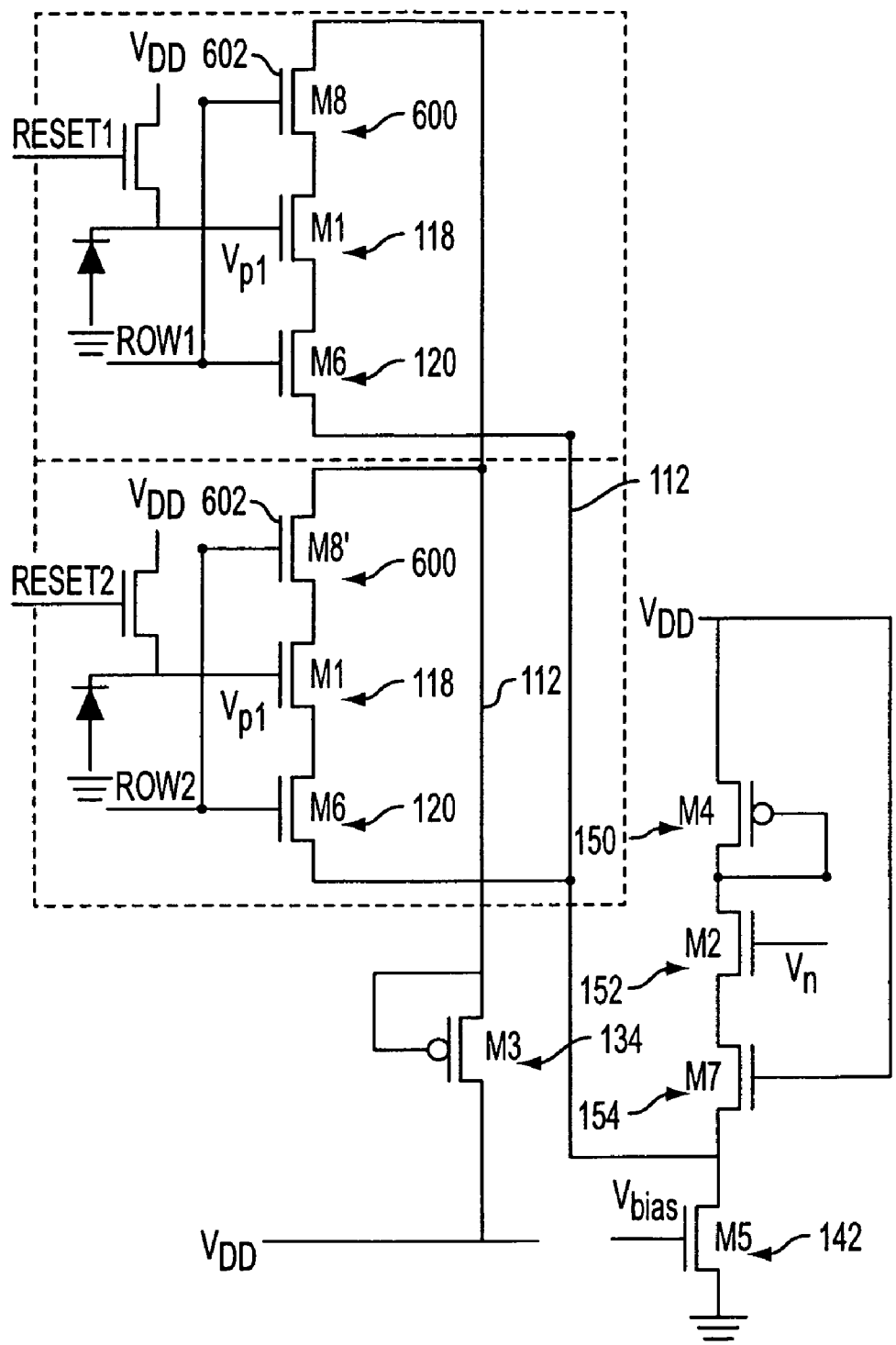
FIG. 6 is a schematic diagram of an APS according to another embodiment including voltage protection for the pixel output transistors.

According to an embodiment shown in FIG. 6, another transistor 600 (denoted M8) may be provided in the pixel between the p-type transistor and pixel output transistor. This blocking transistor may protect the output transistor from being effected by voltage changes in the branch line 135 when reading other pixels in the column.

Figure 7:
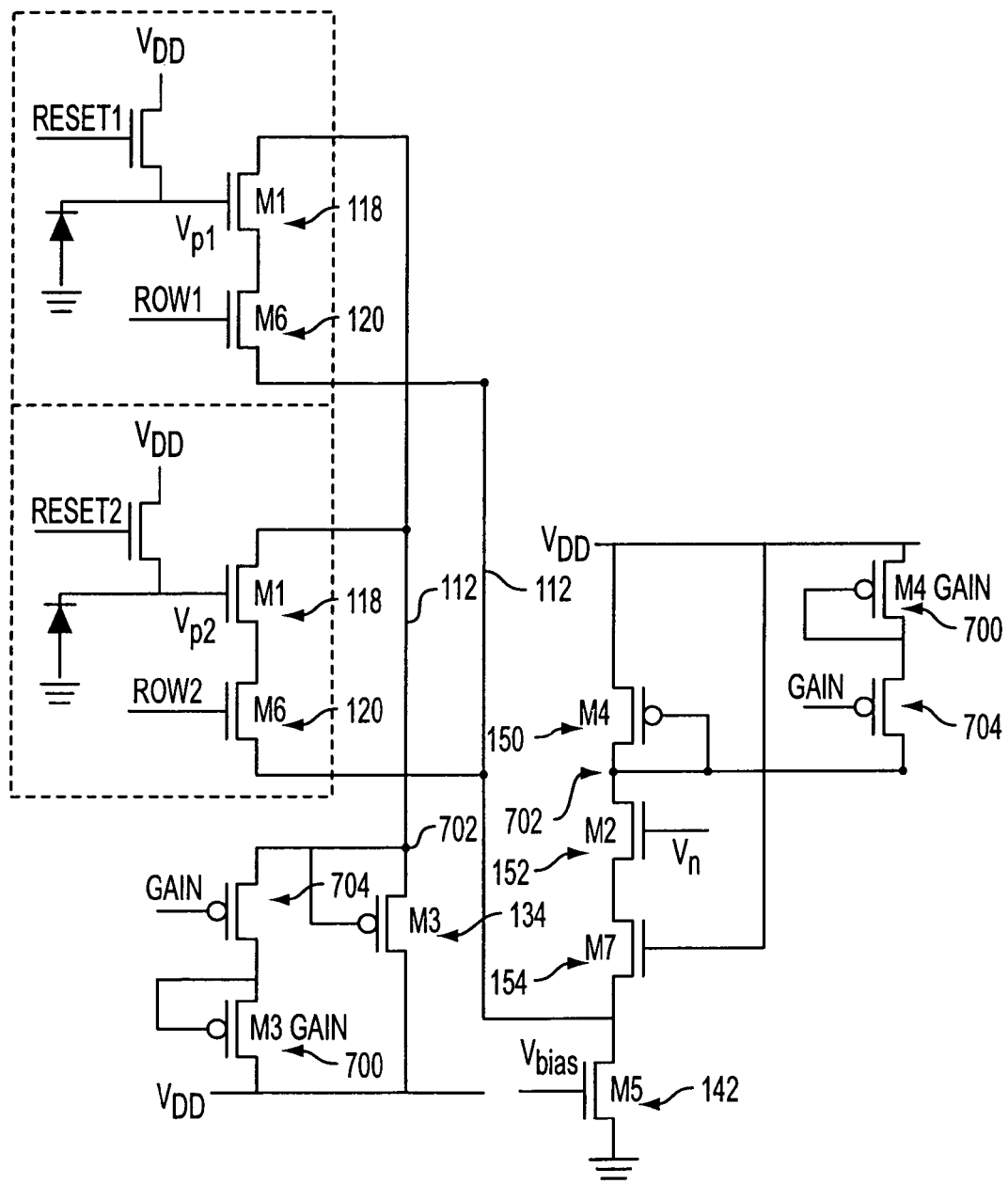
FIG. 7 is a schematic diagram of an APS according to another embodiment including a gain selector in the amplifier.

FIG. 7 shows an embodiment with additional structure added to the amplifier circuit to enable the selection of different gain settings for the amplifier. Another self-biased p-type transistor, gain transistor 700, is added to each branch between $V_{DD}$ and a node 702 at the sources of the p-type transistors 134, 150. A gain-enabled p-type transistor 704 is connected between the node 702 and the source of the gain transistor 700. The gate of each gain-enabled transistor 704 is connected to a variable gain voltage, $V_{gain}$. When $V_{gain}$ is set HIGH, the gain-enabled transistor 704 is OFF and the circuit operates similarly to the embodiment shown in FIG. 1. To alter the gain provided by the amplifier, $V_{gain}$ may be set to LOW, turning the gain-enabled transistor 704 ON and effectively placing p-type transistor 134, 150 (M3, M4) and the respective gain transistor 700 in each branch in parallel. Thus, the effective source resistance of the p-type transistors 134, 150 will decrease. As may be determined from equation (1), this will increase the gain of the amplifier as gain is inversely proportional to the source resistance of the p-type transistors 134, 150.

The branched amplifier according to an embodiment may reduce noise from the substrate because it provides a differential output. The amplifier may also improve the dynamic range of the sensor when reading out a pixel because loss from the source follower may be reduced with the addition amplifier structure.

A number of embodiments of the invention have been described. Nevertheless, it will be understood that various modifications may be made without departing from the spirit and scope of the invention. Accordingly, other embodiments are within the scope of the following claims.

What is claimed is:

1. A method of reading out a signal from an imager pixel in an imager device, said method comprising the acts of:
    converting photo-generated charge from a photosensor in the pixel into a first voltage using a first source follower transistor;
    outputting the first voltage to a first amplifier branch by activating a row select transistor having a first conductivity type and a first transistor having a second conductivity type that is different than the first conductivity type, the first transistor providing a voltage to the first source follower used in the converting step; and
    amplifying the first voltage in a second amplifier branch to form an amplified voltage by activating a second transistor having a same conductivity as the first transistor, a second source follower transistor and a third transistor having a same conductivity as the row select transistor.

2. The method of claim 1, further comprising the act of outputting the amplified voltage.

3. The method of claim 1, wherein said amplifying step applies a gain to the first voltage.

4. A method of reading out a signal from an imager pixel in an imager device, said method comprising the acts of:
    converting photo-generated charge from a photosensor in the pixel into a first voltage using a first source follower transistor;

outputting the first voltage to a first amplifier branch by activating a row select transistor and a first transistor, the first transistor providing a voltage to the first source follower used in the converting step; and amplifying the first voltage in a second amplifier branch to form an amplified voltage by activating a second transistor having a same conductivity as the first transistor, a second source follower transistor and a third transistor having a same conductivity as the row select transistor, wherein said amplifying step applies a gain to the first voltage and the applied gain is a unity gain.

5. A method of reading out a signal from an imager pixel in an imager device, said method comprising the acts of:

converting photo-generated charge from a photosensor in the pixel into a first voltage using a first source follower transistor;

outputting the first voltage to a first amplifier branch by activating a row select transistor having a first conductivity type and a first transistor having a second conductivity type that is different than the first conductivity type, the first transistor providing a voltage to the first source follower used in the converting step;

selecting a gain to be applied to the first voltage; and applying the selected gain to first voltage in a second amplifier branch to form an amplified voltage by activating a second transistor having a same conductivity as the first transistor, a second source follower transistor and a third transistor having a same conductivity as the row select transistor.

6. The method of claim 5, further comprising the act of outputting the amplified voltage.

7. A method of reading out a signal from an imager pixel in an imager device, said method comprising the acts of:

converting photo-generated charge from a photosensor in the pixel into a first voltage using a first source follower transistor;

outputting the first voltage to a first amplifier branch by activating a row select transistor and a first transistor, the first transistor providing a voltage to the first source follower used in the converting step;

selecting a gain to be applied to the first voltage; and applying the selected gain to first voltage in a second amplifier branch to form an amplified voltage by activating a second transistor having a same conductivity as the first transistor, a second source follower transistor and a third transistor having a same conductivity as the row select transistor, wherein the selected gain is a unity gain.

* * * * *